US008029242B2

(12) United States Patent
Teraoka et al.

(10) Patent No.: US 8,029,242 B2
(45) Date of Patent: Oct. 4, 2011

(54) MULTI-BLADE FAN

(75) Inventors: Hironobu Teraoka, Sakai (JP); Akira Komatsu, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 610 days.

(21) Appl. No.: 12/224,724

(22) PCT Filed: Mar. 26, 2007

(86) PCT No.: PCT/JP2007/056148

§ 371 (c)(1), (2), (4) Date: Sep. 4, 2008

(87) PCT Pub. No.: WO2007/114090

PCT Pub. Date: Oct. 11, 2007

(65) Prior Publication Data

US 2009/0028719 A1 Jan. 29, 2009

(30) Foreign Application Priority Data

Mar. 31, 2006 (JP) ................................ 2006-097078
Mar. 12, 2007 (JP) ................................ 2007-062198

(51) Int. Cl.
*B63H 1/26* (2006.01)
*F03D 11/02* (2006.01)

(52) U.S. Cl. ................................ 416/236 R; 416/223 R

(58) Field of Classification Search .............. 416/223 R, 416/236 R

See application file for complete search history.

(56) References Cited

U.S. PATENT DOCUMENTS

| | | | | |
|---|---|---|---|---|
| 4,813,633 | A * | 3/1989 | Werle et al. | 244/130 |
| 5,533,865 | A * | 7/1996 | Dassen et al. | 416/228 |
| 6,830,436 | B2 * | 12/2004 | Shibata et al. | 416/228 |
| 7,815,419 | B2 * | 10/2010 | Teraoka et al. | 416/178 |
| 2006/0269419 | A1 * | 11/2006 | Downs et al. | 416/236 R |

FOREIGN PATENT DOCUMENTS

| | | | |
|---|---|---|---|
| EP | 0 942 175 | A1 | 9/1999 |
| JP | 53-144508 | A | 11/1978 |
| JP | 63-124899 | A | 5/1988 |
| JP | 3-249400 | A | 11/1991 |
| JP | 11-101198 | A | 4/1999 |
| JP | 11-141494 | A | 5/1999 |
| JP | 2005-120877 | A | 5/2005 |
| JP | 2005-351141 | A | 12/2005 |
| JP | 2006-125390 | A | 5/2006 |

* cited by examiner

*Primary Examiner* — Jarrett Stark
*Assistant Examiner* — Nicholas Tobergte
(74) *Attorney, Agent, or Firm* — Birch, Stewart, Kolasch & Birch, LLP

(57) ABSTRACT

In a multi-blade fan provided with a plurality of notches in a blade edge in an outer side of each impeller blade, it is possible to direct an impeller blade outlet in a portion of the notches to a circumferential direction. Also, it is possible to direct an air flow blown out of the fan to the circumferential direction. Further, it is possible to effectively increase a pressure, by setting a projection protruding along a thickness direction of the impeller blade in a rear portion of each notch, in a pressure surface of the impeller blade receiving air pressure on the basis of rotation of the multi-blade fan.

9 Claims, 19 Drawing Sheets

MULTI-BLADE FAN

TECHNICAL FIELD

The present invention relates to a structure of an impeller blade in an impeller of a multi-blade fan.

BACKGROUND ART

Multi-blade fans, such as cross flow fans, sirocco fans, and turbo fans, are used as a blower for an air conditioner.

FIG. 26 shows a wall mounted type air conditioner A using a multi-blade fan as the blower.

The air conditioner A is provided with a main body casing 1. The main body casing 1 is provided with an air intake port 4 in an upper surface, and an air blowing port 5 in a front portion of a lower surface. A heat exchanger 2 and a multi-blade fan 3 are provided within the main body casing 1. The multi-blade fan 3 is arranged between the heat exchanger 2 and the air blowing port 5.

The heat exchanger 2 is constituted by a front side heat exchanging portion 2*a* arranged near a front face of the main body casing 1, and a back side heat exchanging portion 2*b* arranged near a back face of the main body casing 1. The back side heat exchanging portion 2*b* is continuously provided in an upper end of the front side heat exchanging portion 2*a*. An air passage 6 in which the air sucked from the air intake port 4 flows is provided near a front face of the main body casing 1.

Within the main body casing 1, there are provided a first drain pan 8, a second drain pan 9, a guide portion 10, a reverse flow preventing tongue portion 11, a vertical blade 12, and a horizontal blade 13. The vertical blade 12 and the horizontal blade 13 are provided near the air blowing port 5 within the main body casing 1. The first drain pan 8 is provided for receiving a drain generated on the front side heat exchanging portion 2*a*. The guide portion 10 is provided for guiding the air blown out of the impeller 7 of the multi-blade fan 3 to the air blowing port 5. The reverse flow preventing tongue portion 11 is provided for preventing a reverse flow of the air blown out of the impeller 7.

In the air conditioner A, the air sucked from the air intake port 4 is cooled or heated at a time of passing through the heat exchanger 2. Further, the air flows through in a direction which is orthogonal to a rotary shaft, on the impeller 7 of the multi-blade fan 3, and is thereafter blown out of the air blowing port 5.

The impeller 7 is provided with a plurality of circular support plates and a plurality of impeller blades 15. The impeller 7 has a forward swept structure. The circular support plates are arranged so as to be in parallel to each other at a predetermined interval along the rotary shaft of the impeller 7. Each of the impeller blades 15 is arranged at a predetermined blade angle with respect to the rotary shaft in an outer periphery of each of the circular support plates.

In the multi-blade fan 3 mentioned above, noise is generated at a time when the air passes through the impeller blade 15 of the impeller 7. Main causes of the noise generation are separation of air stream generated near a negative pressure surface of the impeller blade 15, and a trailing vortex generated near a trailing edge of the blade.

In order to reduce the noise, for example, there have been proposed a method of discontinuously forming notches in a blade edge on an outer side of each of the impeller blades 15 and a method of forming the blade edge of each of the impeller blades 15 as a saw tooth shape (for example, refer to Patent Documents 1 and 2). In accordance with these methods, it is possible to suppress the trailing vortex generated near the trailing edge of the blade at a time when the air blows out, and it is possible to reduce the noise.

Patent Document 1: Japanese Laid-Open Patent Publication No. 3-249400

Patent Document 2: Japanese Laid-Open Patent Publication No. 11-141494

DISCLOSURE OF THE INVENTION

However, in the conventional structure, since the notches are provided in the blade edge on the outer side of the impeller blade, an outlet of the impeller blade in the notch portion is open without being directed sufficiently to a circumferential direction of the fan, in comparison with the portion having no notch. Accordingly, the air flow blown out of the fan is not directed sufficiently to the circumferential direction at a time of blowing. Therefore, there occurs a problem that the fan pressure is reduced and becomes weak with respect to the pressure loss of the filter or the like, whereby the wind is hard to be output.

In this case, the larger the number of the notches, and the larger the dimension of the notches, the greater the reducing amount of the fan pressure becomes. In order to solve the problem, the inventors of the present invention have proposed a multi-blade fan provided with an impeller blade structure as shown in FIGS. 27 to 30 (for example, refer to Japanese Patent Application No. 2005-269765 (Japanese Laid-Open Patent Publication No. 2006-125390)).

An impeller 7 of a multi-blade fan 3 shown in FIGS. 27 to 30 has a forward swept structure and is provided with a plurality of circular support plates 14 and a plurality of impeller blades 15. The respective circular support plates 14 are arranged in parallel to each other so as to be spaced at a predetermined interval along a rotary shaft 16. Each of the respective impeller blades 15 is arranged at a predetermined blade angle with respect to the rotary shaft 16 in an outer periphery of each of the circular support plates 14.

A plurality of notches 17 formed as a regular triangle shape are provided in a blade edge 15*a* on the outer side of each of the impeller blades 15 so as to be spaced at a predetermined interval along a longitudinal direction of the impeller blade 15. Further, a plurality of smooth portions (unnotched portions) 18 forming a part of the blade edge 15*a* are provided in the blade edge 15*a* on the outer side of each of the impeller blades 15. Each of the smooth portions 18 has a predetermined width, and is provided between adjacent notches 17.

In accordance with this structure, in the case where the multi-blade fan is used as a cross flow fan for an air conditioner, a great lateral vortex discharged from the blade edge is broken into small and stable lateral vortexes by a vertical vortex formed by the notches 17, near a trailing edge of the blade, in a discharge region. Accordingly, noise is reduced.

Further, it is easy to form the notches 17 in comparison with a conventional method of forming the blade edge of the impeller blade as the saw tooth shape. Further, if the structure is made such that the smooth portions 18 form a part of the blade edge, it is possible to maintain the shape of the blade edge of the impeller blade. Further, if each of the notches 17 is formed as the regular triangle shape, it is possible to minimize an area of each notch 17, and it is possible to maximize the area of a pressure surface of each of the impeller blades 15 receiving an air pressure on the basis of a rotation of the fan.

However, in accordance with this structure, since the notches 17 are provided in the blade edge 15*a* on the outer side of the impeller blade 15, an impeller blade outlet in the portion of each notch 17 is open without being directed sufficiently to the circumferential direction, in comparison with a portion (refer to FIG. 33(*a*)) having no notch 17. Accordingly, the air flow blown out of the fan is not directed sufficiently to the circumferential direction at a time of blowing, and is deviated as shown by a two-dot chain line in FIG. 33(*b*). Therefore, the fan pressure is reduced, and becomes weak with respect to the pressure loss of the filter, whereby the wind is hard to be output.

FIG. 31 shows an air sucking and blowing state in the periphery of the impeller 7, in the case where the impeller 7 shown in FIGS. 27 to 30 is applied to the air conditioner A shown in FIG. 26. Further, FIG. 32 shows an air flow flowing through the impeller 7.

In a cross flow fan, air passes through the blade row twice. At this time, the relationship between the air flow and the blade row is reversed on the air intake side and the air blowing side. Since a centrifugal force is applied on the intake side at this time, an increase of the pressure is small. Accordingly, 70% or more of the pressure increase is generated on the blowing side. Therefore, the blade row work on the blowing side is important.

The pressure increase on the blowing side in each of flow lines within the cross flow fan can be expressed by the following expression (Euler's expression).

$$\Delta Pth=\rho(u2v\theta2-u1v\theta1)$$

u: circumferential velocity of impeller
vθ: circumferential velocity component of fluid
subscript 1: inner peripheral side of impeller
subscript 2: outer peripheral side of impeller According to the expression mentioned above, in the case of the cross flow fan, the greater the circumferential velocity component of the fluid, the more increased the pressure becomes, on the blowing side of the air, that is, on the outer peripheral side of the impeller blade. Accordingly, in order to improve a blowing performance, it is essential to avoid a reduction of the pressure on the blowing side.

As shown in FIGS. 27 and 28, a multi-blade fan such as a cross flow fan or the like has a plurality of side plates 14 for fixing a plurality of impeller blades 15 arranged in the circumferential direction and ensuring the strength of the impeller 7. The side plates 14 is provided in both ends and a center portion in a longitudinal direction of the impeller 7. Accordingly, an air flow velocity FV is lowered in the vicinity of each of the side plates 14 due to an influence of the side plates 14, as shown in FIG. 34.

Specifically, a sufficiently high wind velocity FV1 can be obtained in the portion having no side plate 14. However, the wind velocity FV2 is lowered in the vicinity of each side plate 14, and the wind velocity FV3 is more largely lowered than the wind velocity FV2 in both end portions of the impeller 7 which is adjacent to both side walls 1*a* and 1*b* of the main body casing 1.

Accordingly, in the case where the notches 17 having the same size are only provided in the outer end portion of the blade, there is caused an excessive reduction of the fan pressure in the same manner as the case where the larger recesses than the notches 17 for obtaining the noise reducing effect are arranged in the vicinity of both ends of the impeller blade 15 and in the vicinity of both ends of the impeller 7.

An objective of the present invention is to provide a multi-blade fan provided with a plurality of notches in a blade edge on an outer side of an impeller blade, in which a fan pressure is effectively increased by setting a projection protruding along a thickness direction of the impeller blade in the vicinity of a rear portion of the notch in a pressure surface of the impeller blade.

In order to achieve the objective mentioned above, and in accordance with a first aspect of the present invention, there is provided a multi-blade fan provided with a plurality of notches in a blade edge on an outer side of an impeller blade, wherein a projection protruding along a thickness direction of the impeller blade is provided in a rear portion of each of the notches in a pressure surface of the impeller blade receiving an air pressure on the basis of rotation of the multi-blade fan.

In accordance with the structure mentioned above, it is possible to direct an impeller blade outlet of the notch portion to a circumferential direction. Accordingly, it is possible to direct an air flow blown out of the fan to the circumferential direction, and it is possible to increase a fan pressure.

Accordingly, even in the case where a resistance such as a filter or the like is provided, it is possible to secure a desired wind amount at a lower rotating speed, in comparison with the conventional impeller blade provided only with notches. Therefore, it is possible to reduce noise generated by the rotation of the fan.

Further, since the outer end portion of the impeller blade is not planar, it is possible to suppress the trailing vortex generated in the trailing edge of the blade at a time of blowing, and noise is effectively reduced.

In the multi-blade fan mentioned above, it is preferable that the impeller blade has a recess in a negative pressure surface in an opposite side to the pressure surface, and the recess is formed by removing a portion corresponding to the projection in the negative pressure surface. In this case, the width between adjacent blades is widened in the rear portion of the notch. Accordingly, air easily flows between adjacent blades, and it is possible to further improve the fan pressure.

In the multi-blade fan mentioned above, it is preferable that the projection and the recess extend along a single circular arc. In this case, it is possible to easily form the projection and the recess, and the costs are reduced.

In the multi-blade fan mentioned above, the projection and the recess may extend along a plurality of circular arcs having different curvatures. In this case, it is possible to more smoothly flow the air between adjacent blades, and it is possible to further improve the fan pressure.

In the multi-blade fan mentioned above, it is preferable that the height of the projection becomes smaller toward the blade edge of the impeller blade. Further, in the multi-blade fan mentioned above, it is preferable that the depth of the recess becomes smaller toward the blade edge of the impeller blade. In these cases, it is possible to effectively suppress the trailing vortex generated in the trailing edge of the blade at a time of blowing, and it is possible to reduce noise.

In the multi-blade fan mentioned above, it is preferable that the notches in both ends of the impeller blade are smaller than the notch provided in the center portion of the impeller blade. A multi-blade fan such as a cross flow fan has a plurality of side plates for fixing a plurality of impeller blades arranged in the circumferential direction and securing the strength of the impeller. Each of the side plates is provided in both ends and a center portion in the longitudinal direction of the impeller. In this case, the air flow speed is lowered in the vicinity of the side plate. Accordingly, in the case where the notches having the same size are only provided in the outer end portion of the blade, the excessive reduction of the fan pressure is caused in the same manner as the case where the larger recesses than the notch for obtaining the noise reducing effect are provided, in the vicinity of both ends of the impeller blade.

In order to solve the problem, the notch in the vicinity of both ends of the impeller blade (in the portion close to the side plate) is formed smaller than the notch provided in the center portion of the impeller blade. Accordingly, it is possible to sufficiently maintain the noise reducing effect generated by the notches. Further, in comparison with the structure in which the notches having the same size are only provided, it is possible to further increase the fan pressure and it is possible to avoid the reduction of the blowing performance.

In the multi-blade fan mentioned above, it is preferable that the notches in both ends of the multi-blade fan are smaller than the notch provided in the center portion of the multi-blade fan. A multi-blade fan such as a cross flow fan has a plurality of side plates for fixing a plurality of impeller blades arranged in the circumferential direction and securing the strength of the impeller. The side plates are provided in both ends and the center portion of the impeller. In this case, the air flow velocity is lowered in the vicinity of the side plate.

Specifically, a sufficiently high wind velocity can be obtained in the portion having no side plate, the air flow velocity is lowered in the vicinity of the side plate, and the air flow velocity is largely lowered in the vicinity of both ends of the impeller which is adjacent to both side walls of the main body casing.

Accordingly, in the case where the notches having the same size are only provided in the outer end portion of the blade, the excessive reduction of the fan pressure is caused in the same manner as the case where the larger recesses than the notch for obtaining the noise reducing effect are arranged, in the vicinity of both ends of the impeller blade (in the vicinity of both ends of the impeller).

In order to solve the problem, the notches in the vicinity of both ends of the impeller (in the portion close to the side wall of the main body casing) are formed smaller than the notch in the center portion of the impeller. Accordingly, the noise reducing effect by the notch is sufficiently maintained. Further, in comparison with the structure in which the notches having the same size are only provided discontinuously, it is possible to further increase the fan pressure and it is possible to avoid the reduction of the blowing performance.

It is preferable that the multi-blade fan mentioned above is constituted by a blower for an air conditioner.

In accordance with the structure mentioned above, it is possible to effectively increase the pressure in the multi-blade fan provided with the notches in the outer end portion of the impeller blade. Further, even in the case where the resistance such as a filter or the like is provided, it is possible to secure a desired wind amount. Further, since the outer end portion of the impeller blade is not planar, it is possible to suppress the trailing vortex generated at a time of blowing in the vicinity of the trailing edge of the blade, and it is possible to reduce the noise. Accordingly, it is possible to achieve the multi-blade fan which is preferable for the blower for the air conditioner such as a cross flow fan. By extension, it is possible to achieve an air conditioner with a high level of performance in terms of low noise operations as well as with stability in the degree of blowing amount.

BRIEF DESCRIPTION OF THE DRAWINGS

FIG. 33(*b*) is a cross-sectional view taken along line 33(*b*)-33(*b*) in FIG. 30.

BEST MODE FOR CARRYING OUT THE INVENTION

First Embodiment

A description will be given below of a first embodiment according to the present invention with reference to the accompanying drawings.

Figure 27:
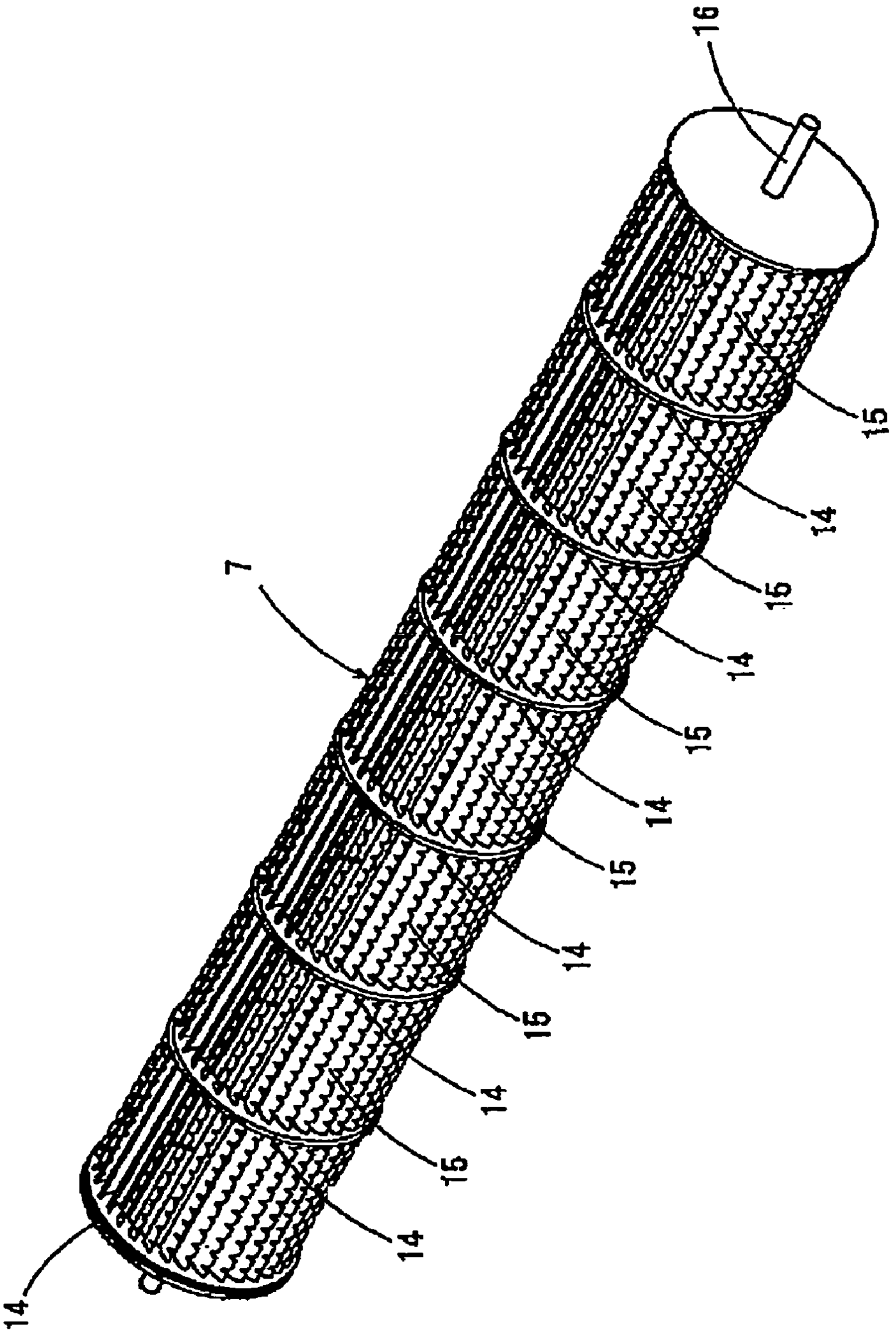
FIG. 27 is a perspective view showing the entire structure of an impeller.
Figure 28:
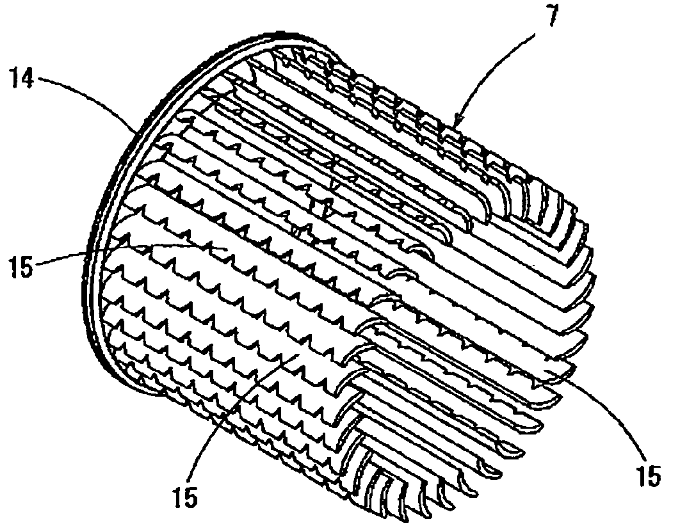
FIG. 28 is an enlarged perspective view showing a part of the impeller.
Figure 29:
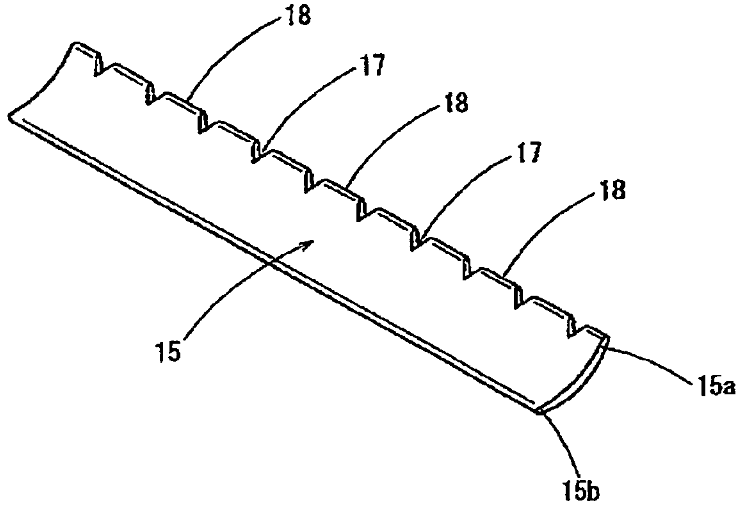
FIG. 29 is a perspective view showing a conventional impeller blade.
Figure 30:
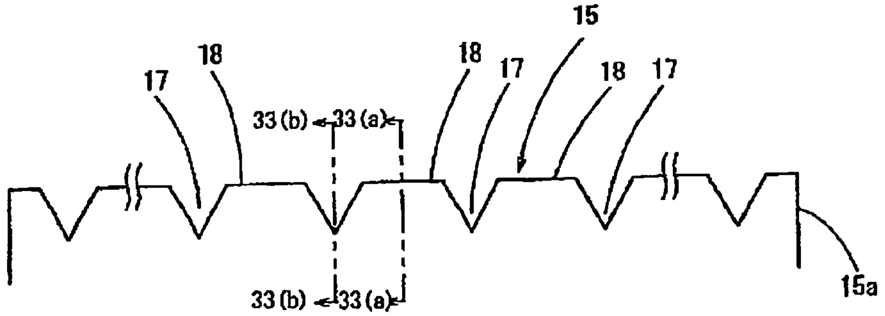
FIG. 30 is an enlarged front view showing a portion in the vicinity of an outer end portion of the impeller blade.

An impeller of a multi-blade fan in accordance with the present embodiment is formed as a forward swept structure in the same manner as the conventional structure shown in FIG. 27. Further, the impeller is provided with a plurality of circular support plates 14, and a plurality of impeller blades 15 each having a circular arc shaped cross section. The circular support plates 14 are arranged in parallel to each other so as to be spaced at a predetermined interval along a rotary shaft 16. Each of the impeller blades 15 is arranged at a predetermined blade angle with respect to the rotary shaft 16, in an outer periphery of each of the circular support plates 14.

Figure 1:
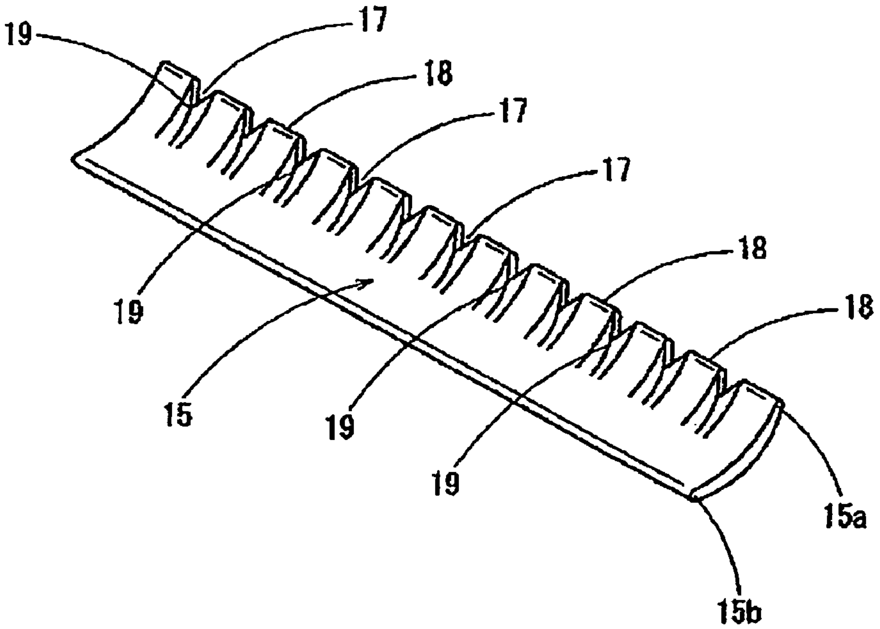
FIG. 1 is a perspective view of an impeller blade of a multi-blade fan in accordance with a first embodiment as seen from a pressure surface.
Figure 2:
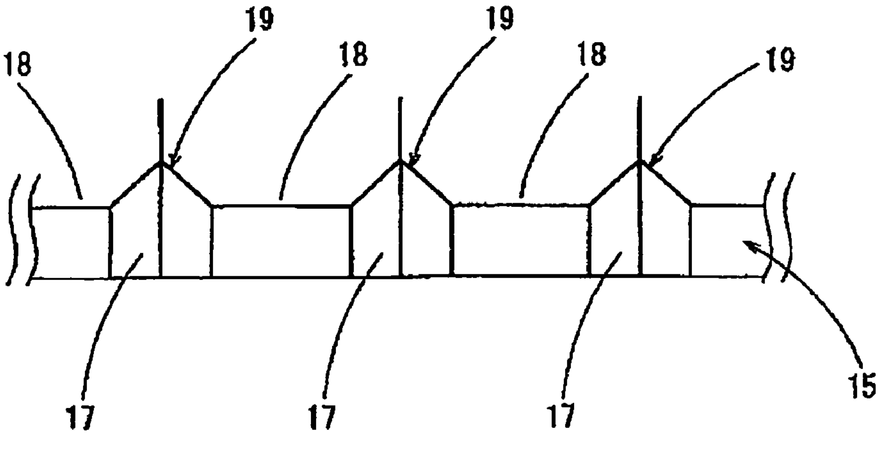
FIG. 2 is an enlarged side view showing a portion in the vicinity of an outer end portion of the impeller blade.
Figure 3:
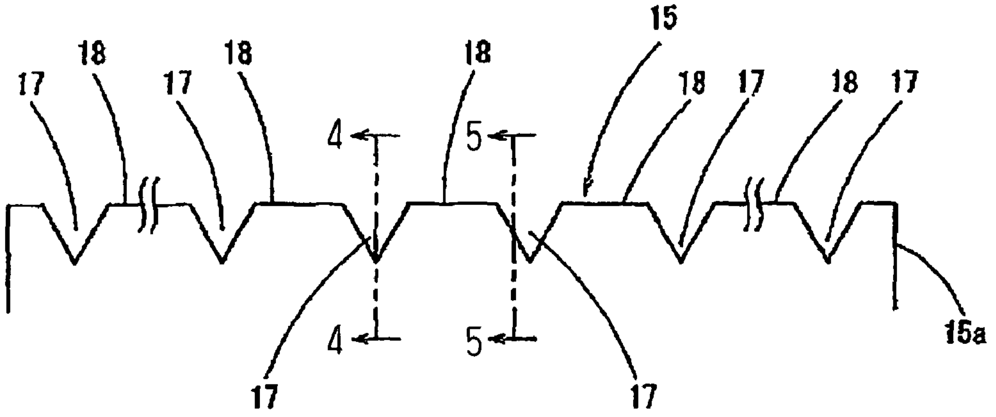
FIG. 3 is a partial side view of the impeller blade as seen from a negative pressure surface.

As shown in FIGS. 1 to 3, a plurality of notches 17 formed as a regular triangle shape are provided in a blade edge 15*a* in an outer side of each of the impeller blades 15 so as to be spaced at a predetermined interval along the longitudinal direction of the impeller blade 15. Further, a plurality of smooth portions (unnotched portions) 18 forming a part of the blade edge are provided in the blade edge 15*a* in the outer side of each of the impeller blades 15. Each of the smooth portions 18 has a predetermined width, and is provided between adjacent notches 17.

Figure 26:
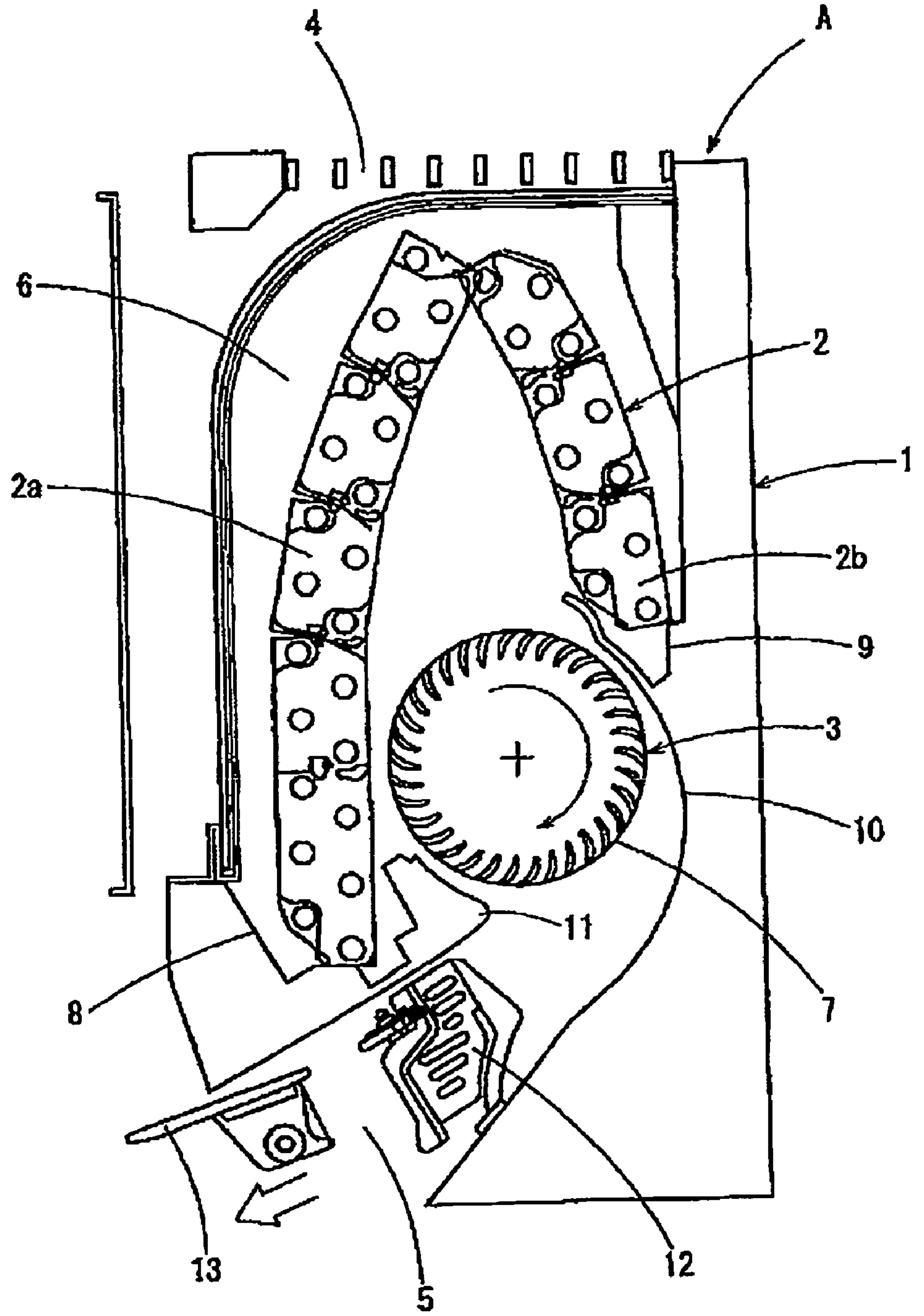
FIG. 26 is a vertical cross-sectional view of a wall mounted type air conditioner provided with a multi-blade fan.
Figure 31:
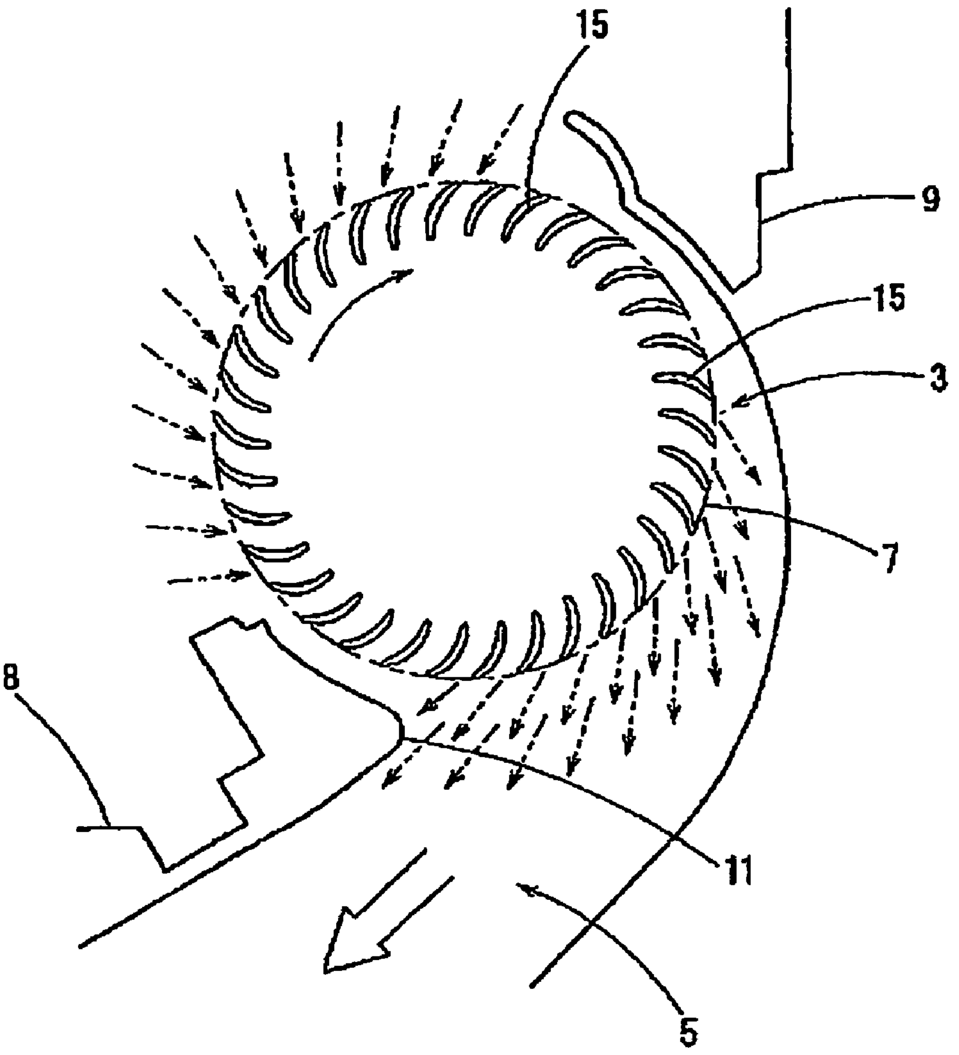
FIG. 31 is a schematic view showing air flow at a time of using the conventional impeller.
Figure 32:
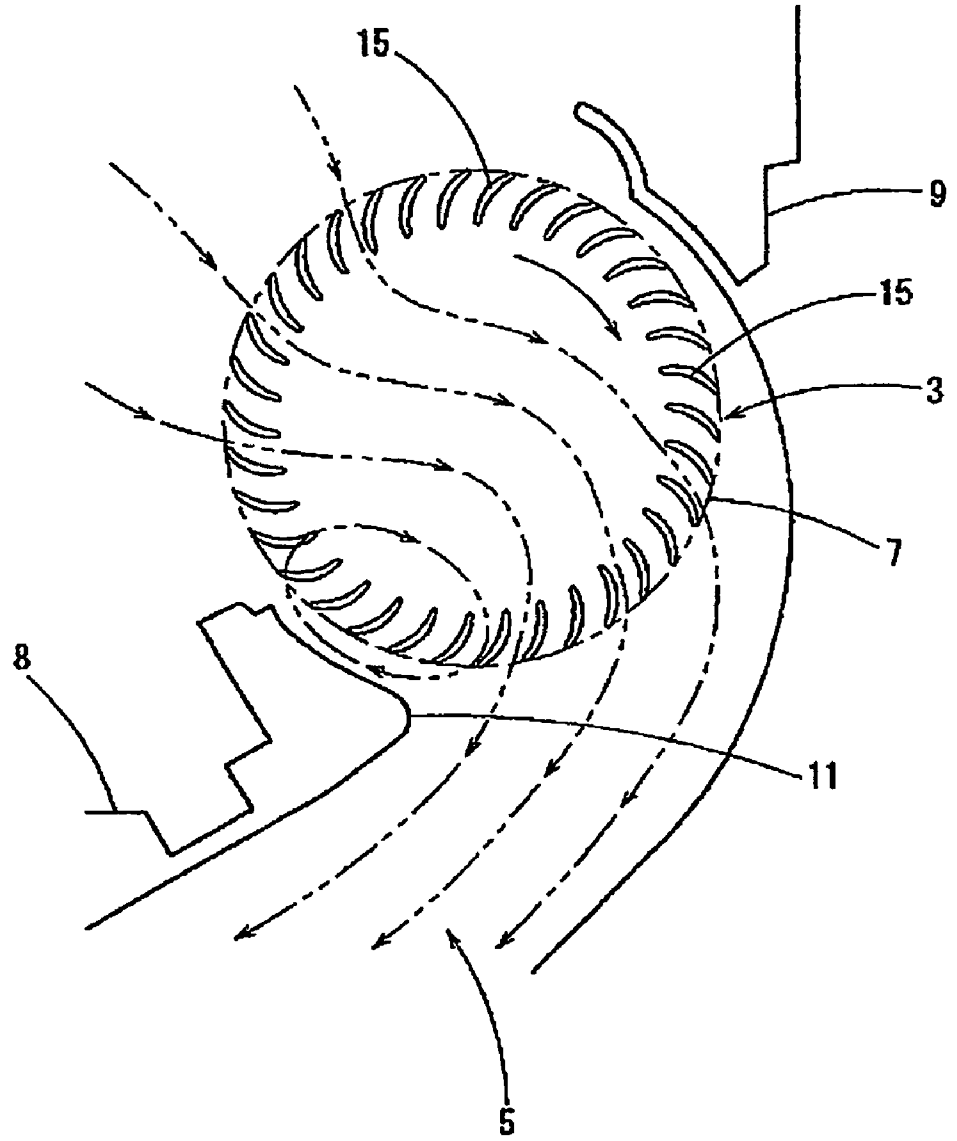
FIG. 32 is a schematic view showing air flow within the impeller.
Figure 33A:
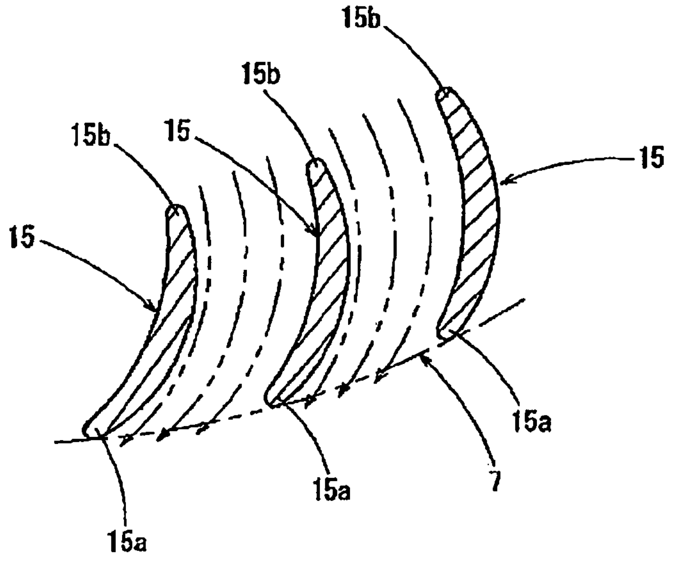
FIG. 33(*a*) is a cross-sectional view taken along line 33(*a*)-33(*a*) in FIG. 30.
Figure 33B:
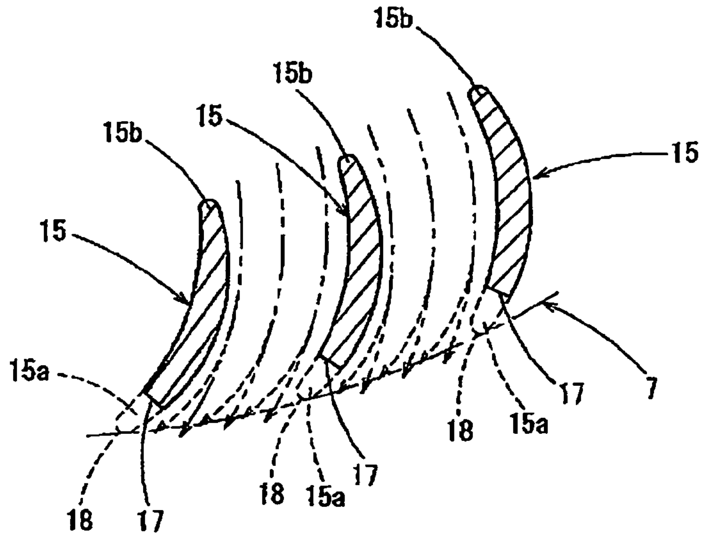

In the case of using the multi-blade fan provided with the notches 17 in the blade edge 15*a* of the impeller blade 15 and the smooth portion 18 between adjacent notches 17 as the cross flow fan (refer to FIGS. 26, 31 and 32), as mentioned above, a large lateral vortex discharged from the blade edge is broken into small and stable lateral vortexes by a vertical vortex formed by the notches 17 in the vicinity of the trailing edge of the blade, in the blowing side region. Accordingly, noise is reduced.

However, in the case where only the notches 17 are provided in the blade edge 15*a* in the outer side of the impeller blade 15, as mentioned above, an impeller blade outlet in the portion of each notch 17 is open without being directed sufficiently to the circumferential direction, in comparison with the portion having no notch 17. Accordingly, the air flow blown out of the fan is not directed sufficiently to the circumferential direction as shown by a two-dot chain line in FIG. 6, at a time of blowing the air. Accordingly, the fan pressure is reduced, and becomes weak with respect to the pressure loss of the filter or the like, and the wind is hard to be output. In this case, the larger the number of the notches 17, and the larger the dimension of each notch 17, the larger the pressure reducing amount becomes.

In order to solve the problem mentioned above, in accordance with the present embodiment, a triangular pyramid-shaped projection 19 is provided in the vicinity of the rear portion of each notch 17 in the pressure surface (the concave surface) of the impeller blade, as shown in FIGS. 1, 2, 4 and 5. Accordingly, it is possible to direct the impeller blade outlet in the portion of the notch portion to the circumferential direction, and it is possible to direct the air flow blown out of the fan sufficiently to the circumferential direction. It is thus possible to effectively increase the fan pressure.

Figure 6:
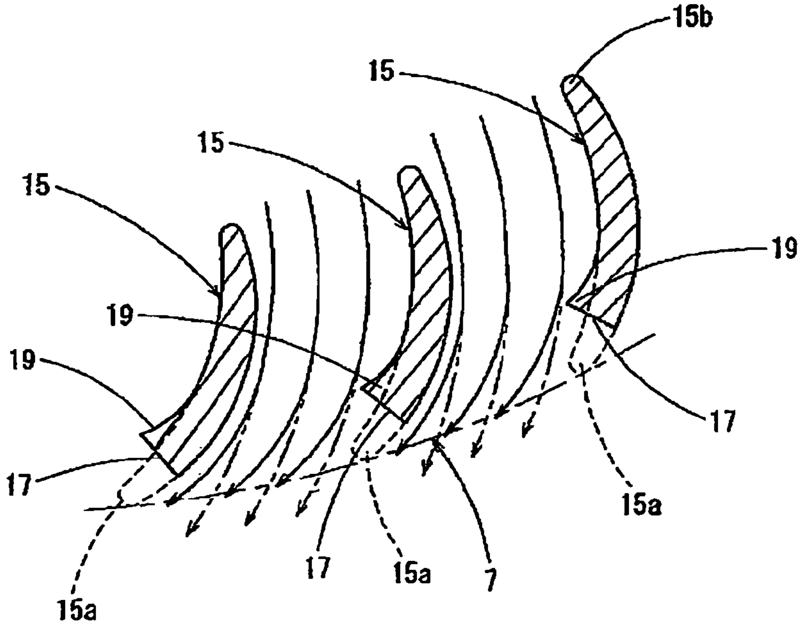
FIG. 6 is a cross-sectional view showing an operation of the impeller blade.

As mentioned above, in the case of the multi-blade fan 3 in which a plurality of notches 17 are provided in the blade edge 15*a* in the outer side of the impeller blade 15, it is possible to direct the impeller blade outlet in the portion of the notches 17 sufficiently to the circumferential direction in the same manner as the portion having no notch 17 (shown by a broken line) as shown by a solid line in FIG. 6, by setting the triangular pyramid-shaped projection 19 in the vicinity of the rear portion of each notch 17 in the pressure surface of the impeller blade. Accordingly, it is possible to increase the fan pressure.

In accordance with this structure, even in the case where resistance such as a filter exists, it is possible to secure a desired wind amount at a lower rotating speed, in comparison with the conventional impeller blade in which only the notches are provided. Accordingly, it is possible to reduce the noise caused by the rotation of the fan.

Further, since the blade edge 15*a* of the impeller blade 15 is not planar, it is possible to suppress the trailing vortex generated at a time of blowing in the vicinity of the trailing edge of the blade, and it is possible to further effectively reduce the noise.

Figure 4:
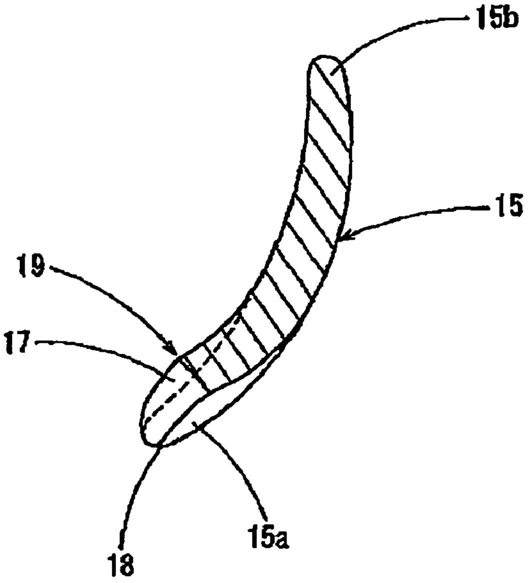
FIG. 4 is a cross sectional view taken along line 4-4 in FIG. 3.
Figure 5:
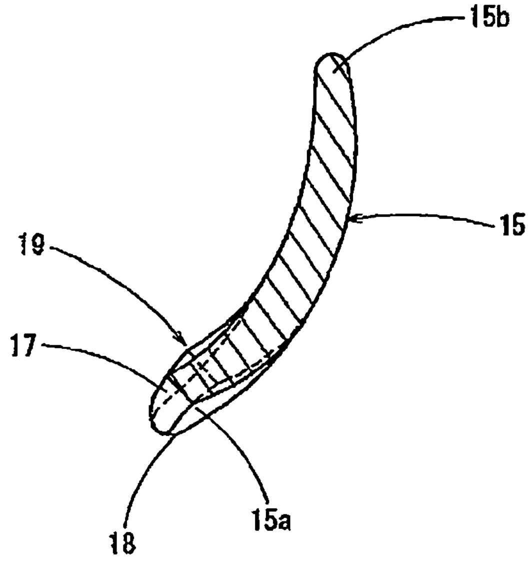
FIG. 5 is a cross sectional view taken along line 5-5 in FIG. 3.

As shown in FIGS. 4 and 5, the height of each projection 19 is set so as to become smaller toward the blade edge 15*a*, for smoothening the air flow on the pressure surface of the impeller blade. In this case, since the outer end portion of the impeller blade does not become planar, it is possible to effectively suppress the trailing vortex generated in the vicinity of the trailing edge of the blade at a time of blowing, and it is possible to reduce the noise.

Second Embodiment

A description will be given of a multi-blade fan in accordance with a second embodiment with reference to FIGS. 7 and 8.

Figure 7:
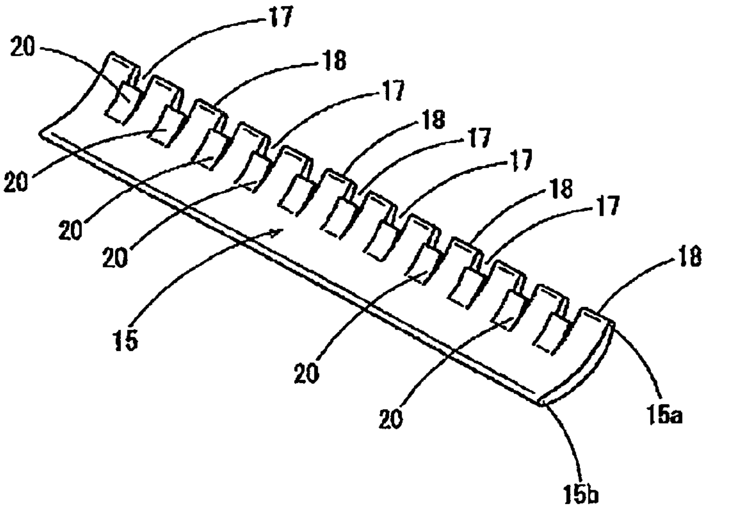
FIG. 7 is a perspective view of an impeller blade of a multi-blade fan in accordance with a second embodiment as seen from a pressure surface.
Figure 8:
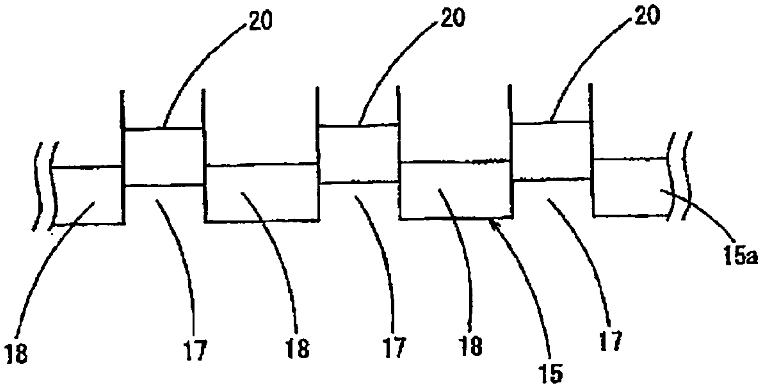
FIG. 8 is a partial side view showing a portion in the vicinity of an outer end portion of the impeller blade.
Figure 9:
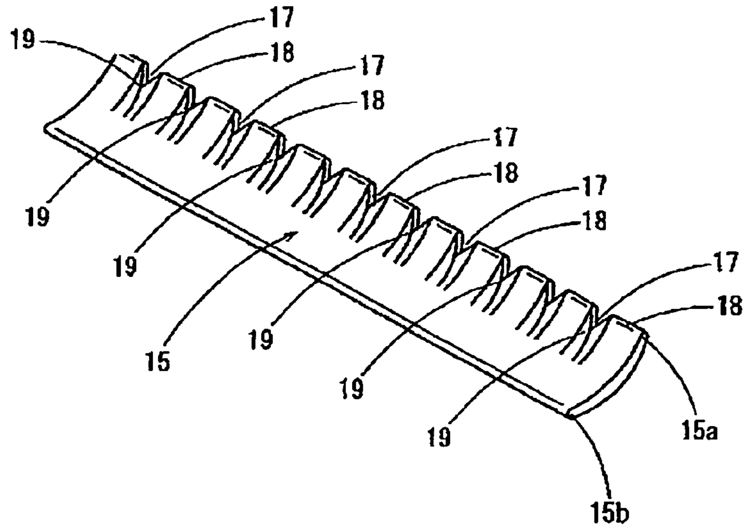
FIG. 9 is a perspective view of an impeller blade of a multi-blade fan in accordance with a third embodiment as seen from a pressure surface.
Figure 10:
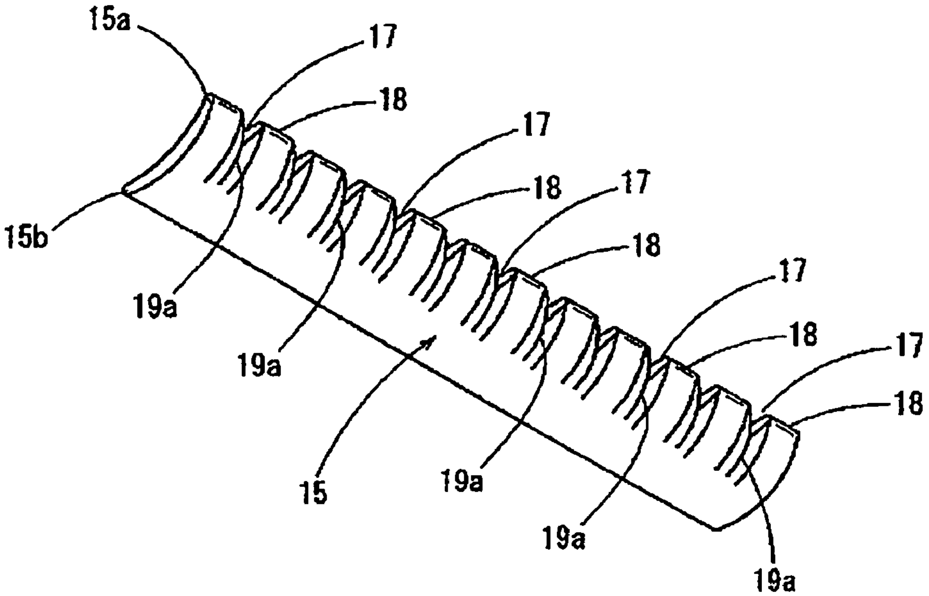
FIG. 10 is a perspective view showing the impeller blade as seen from a negative pressure surface.
Figure 11:
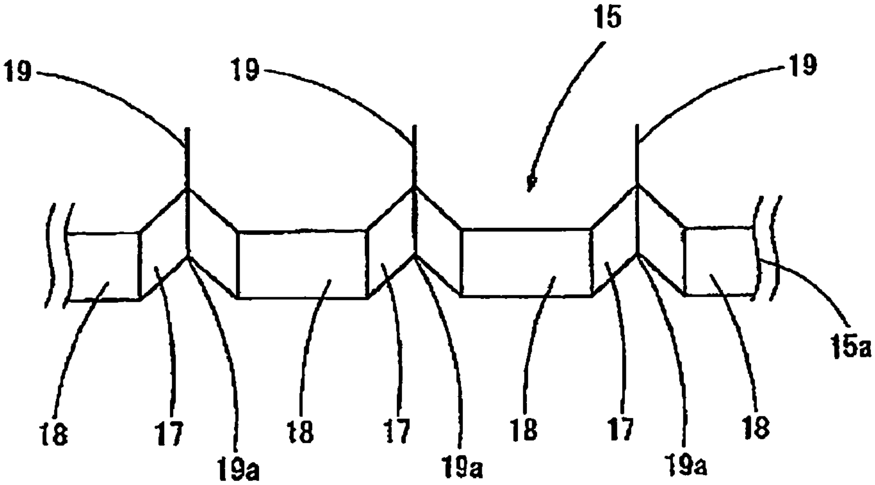
FIG. 11 is an enlarged side view showing a portion in the vicinity of an outer end portion of the impeller blade.
Figure 12:
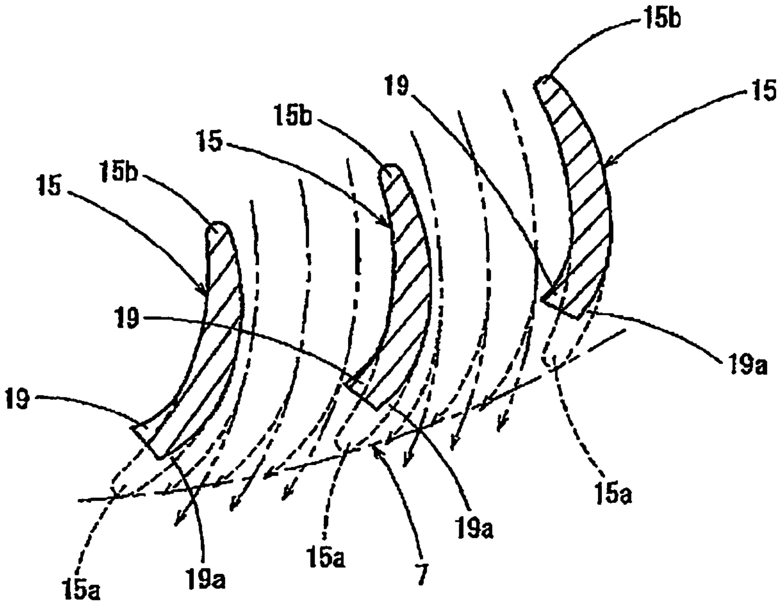
FIG. 12 is a cross-sectional view showing an operation of the impeller blade.

In the present embodiment, as shown in FIGS. 7 and 8, the triangular notches 17 shown in the first embodiment are replaced by rectangular notches 17, and a rectangular projection 20 is provided in the vicinity of the rear portion of each notch 17 in the pressure surface of the impeller blade 15. Accordingly, the impeller blade outlet in the portion of the notches 17 is directed to the circumferential direction. Accordingly, it is possible to direct the air flow blown out of the fan to the circumferential direction, and it is possible to effectively increase the fan pressure.

As mentioned above, in the case of the multi-blade fan 3 provided with a plurality of notches 17 in the blade edge 15*a* in the outer side of the impeller blade 15, it is possible to direct the impeller blade outlet in the portion of the notches 17 sufficiently to the circumferential direction in the same manner as the portion (shown by a broken line) having no notch 17, as shown by a solid line in FIG. 6, by setting the rectangular projection 20 in the vicinity of the rear portion of each notch 17 in the pressure surface of the impeller blade. Accordingly, it is possible to increase the fan pressure.

In accordance with this structure, even in the case where resistance such as a filter exists, it is possible to secure a desired wind amount at a lower rotating speed in comparison with the conventional impeller blade in which the notches are only provided. Accordingly, it is possible to reduce the noise caused by the rotation of the fan.

Further, since the blade edge 15*a* of the impeller blade 15 is not planar, it is possible to suppress the trailing vortex generated at a time of blowing in the vicinity of the trailing edge of the blade, and it is possible to further effectively reduce the noise.

Third Embodiment

A description will be given of a multi-blade fan in accordance with a third embodiment with reference to FIGS. 9 to 12.

In the present embodiment, as shown in FIGS. 9 to 12, the same triangular notches 17 as the first embodiment are provided in the blade edge 15*a* of the impeller blade 15, and the triangular pyramid-shaped projections 19 are provided in the vicinity of the rear portion of the notches 17 in the pressure surface of the impeller blade 15. Accordingly, it is possible to direct the impeller blade outlet in the portion of the notches 17 to the circumferential direction. Therefore, it is possible to direct the air flow blown out of the fan to the circumferential direction, and it is possible to effectively increase the fan pressure. Further, in the present embodiment, the impeller blade 15 has recesses 19*a* in a negative pressure surface on an opposite side to the pressure surface. Each recess 19*a* is formed by removing a portion corresponding to the projection 19 in the negative pressure surface of the impeller blade 15. Accordingly, recess and projection are provided in the vicinity of each rear portion of the notch 17, in the impeller blade 15.

In accordance with this structure, in addition to the above-mentioned operations and advantages obtained by the triangular pyramid-shaped projections 19, it is possible to enlarge the width between adjacent blades in the vicinity of the rear portion of the notches 17, by the recess 19*a* positioned in a back side of each projection 19. Accordingly, the air easily flows between adjacent blades, and it is possible to further improve the fan pressure.

The projection and the recess in the vicinity of the rear portion of each notch 17 may extend along a circular arc having the same curvature. In this case, it is possible to easily form the projection and the recess, and the cost is reduced. Further, the projection and the recess may extend along a plurality of circular arcs having different curvatures. In this case, the air flows more easily between adjacent blades, and it is possible to further improve the fan pressure.

The depth of each recess 19*a* is set in such a manner as to become smaller toward the blade edge 15*a* of the impeller blade 15. In accordance with this structure, it is possible to more effectively suppress the trailing vortex generated in the vicinity of the trailing edge of the blade at a time of blowing, and it is possible to reduce the noise.

Fourth Embodiment

Figure 14:
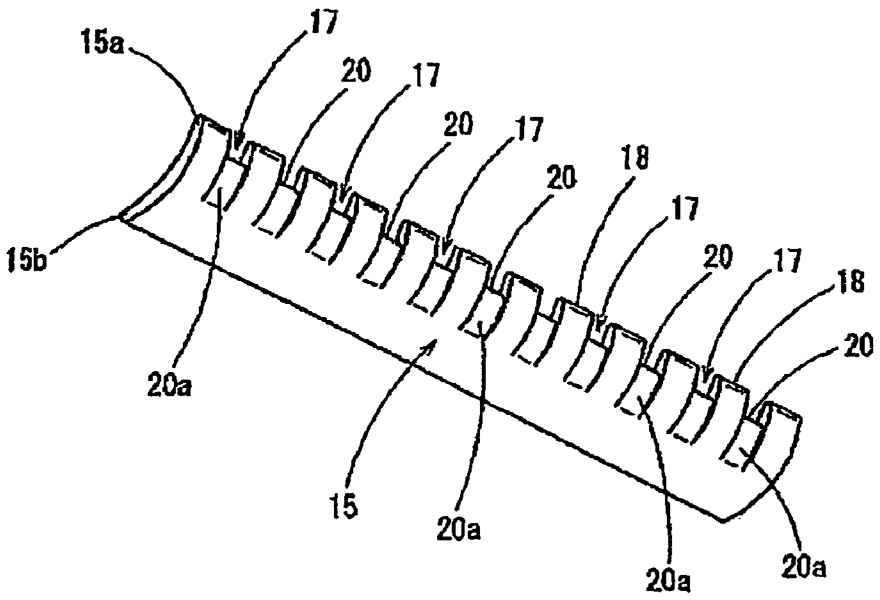
FIG. 14 is a perspective view showing the impeller blade as seen from a negative pressure surface.
Figure 15:
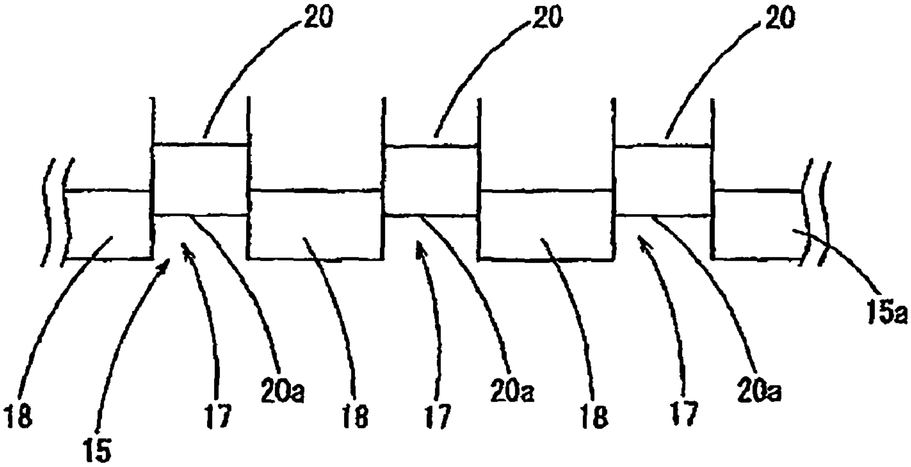
FIG. 15 is an enlarged side view showing a portion in the vicinity of an outer end portion of the impeller blade.
Figure 16:
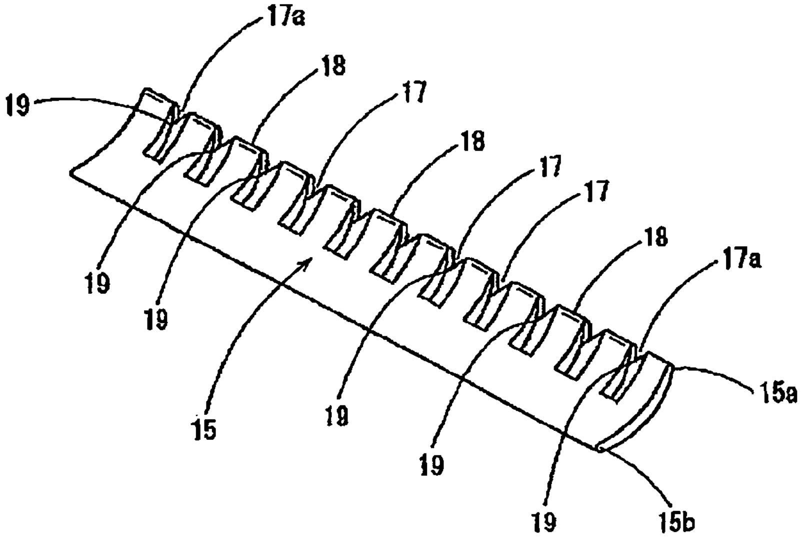
FIG. 16 is a perspective view of an impeller blade of a multi-blade fan in accordance with a fifth embodiment as seen from a pressure surface.
Figure 17:
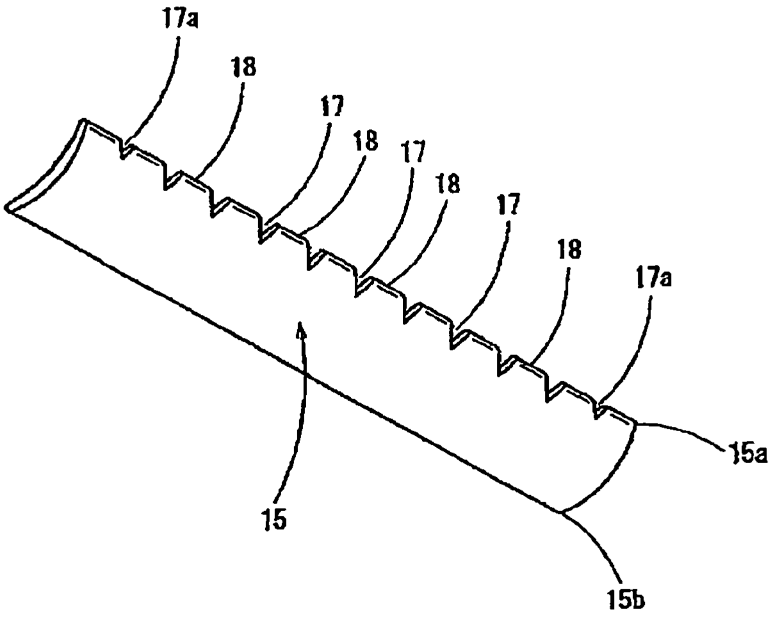
FIG. 17 is a perspective view showing the impeller blade as seen from a negative pressure surface.
Figure 18:
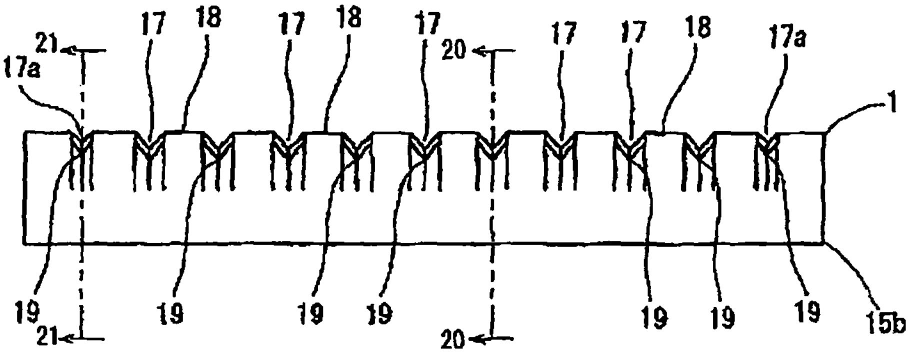
FIG. 18 is a front view showing the impeller blade as seen from the pressure surface.
Figure 19:
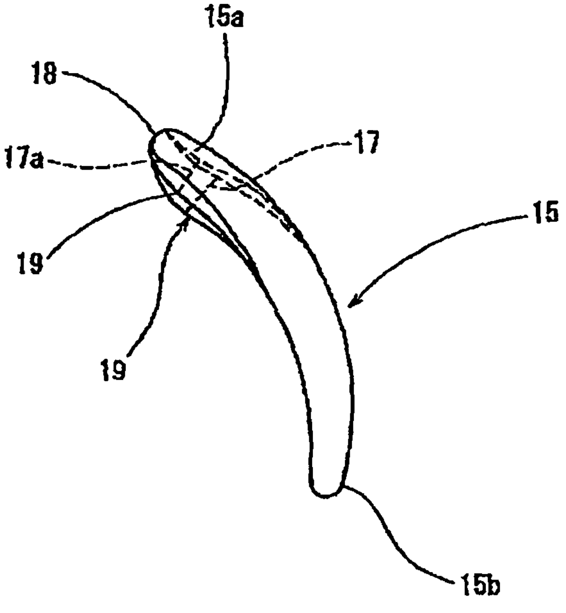
FIG. 19 is a side view of the impeller blade.
Figure 20:
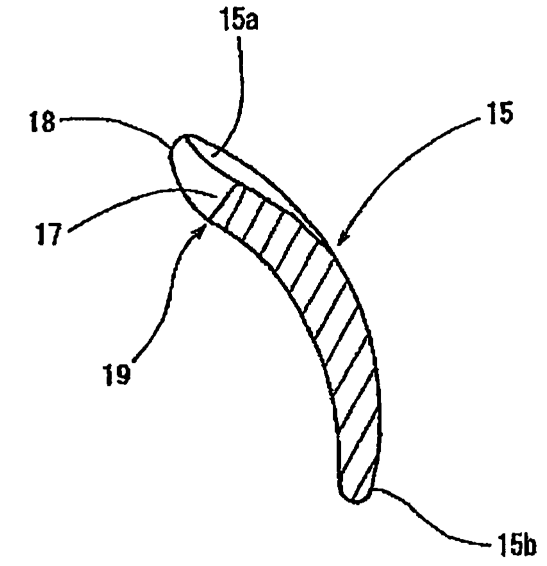
FIG. 20 is a cross-sectional view taken along line 20-20 in FIG. 18.
Figure 21:
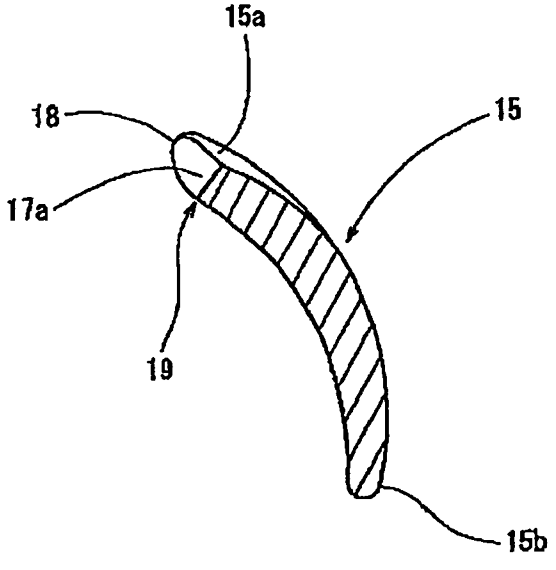
FIG. 21 is a cross-sectional view taken along line 21-21 in FIG. 18.

A description will be given of a multi-blade fan in accordance with a fourth embodiment with reference to FIGS. 13 to 15.

Figure 13:
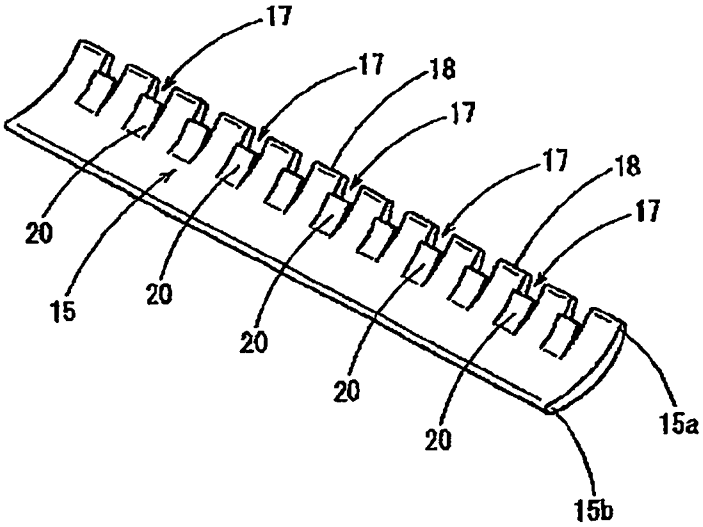
FIG. 13 is a perspective view of an impeller blade of a multi-blade fan in accordance with a fourth embodiment as seen from a pressure surface.

In the present embodiment, as shown in FIG. 13, the same rectangular notches 17 as the second embodiment are provided in the blade edge 15*a* in the outer side of the impeller blade 15, and projections 20 are provided in the vicinity of the rear end of the notches 17 in the pressure surface of the impeller blade 15. Accordingly, it is possible to direct the impeller blade outlet in the portion of the notches 17 to the circumferential direction. Therefore, it is possible to direct the air flow blown out of the fan to the circumferential direction, and it is possible to effectively increase the fan pressure. Further, in the present embodiment, as shown in FIGS. 14 and 15, the impeller blade 15 has recesses 20*a* in a negative pressure surface in an opposite side to the pressure surface. Each recess 20*a* is formed by removing a portion corresponding to the projection 20 in the negative pressure surface of the impeller blade 15. Accordingly, recess and projection are provided in the vicinity of the rear portion of each notch 17 in the impeller blade 15.

In accordance with this structure, in addition to the above-mentioned operations and advantages obtained by the rectangular projections 20, it is possible to enlarge the width between adjacent blades in the vicinity of the rear portion of each notch 17 by the recess 20*a* positioned in the back side of each projection 20. Accordingly, the air flows easily between the adjunct blades, and it is possible to further improve the fan pressure.

Fifth Embodiment

A description will be given of a multi-blade fan in accordance with a fifth embodiment with reference to FIGS. 16 to 21.

In the present embodiment, in the multi-blade fan 3 in accordance with the first embodiment, the width and the depth of notches 17*a* in the vicinity of both ends of the impeller blade 15 (in a portion close to each side plate 14) are set smaller than the width and the depth of each notch 17 provided in the center portion of the impeller blade 15.

Figure 34:
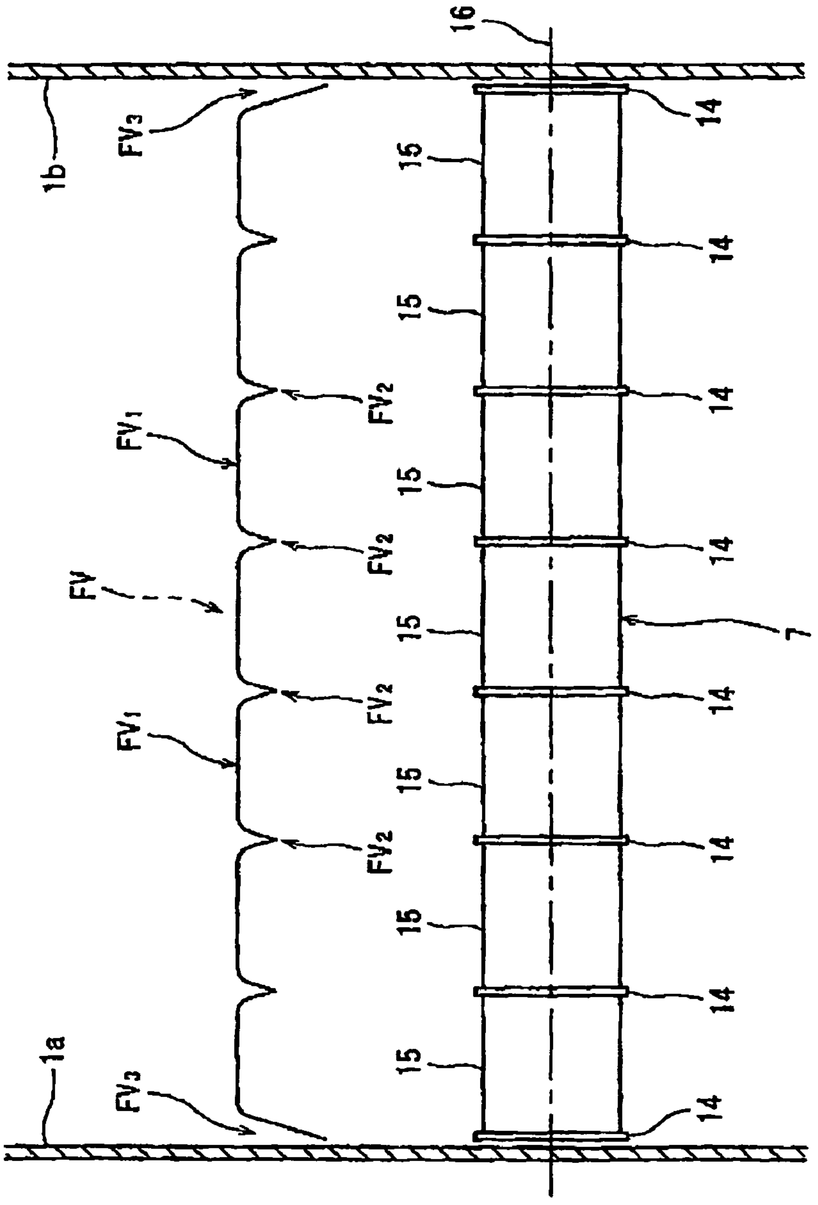
FIG. 34 is an explanatory view for explaining the wind speed distribution in side plates of an impeller and both side walls of a main body casing.

A multi-blade fan such as a cross flow fan has a plurality of side plates 14 for securely fixing a plurality of impeller blades 15 arranged in the circumferential direction and securing the strength of the impeller 7. The side plates 14 are provided in both ends and a center portion in the longitudinal direction of the impeller 7. Accordingly, as shown in FIG. 34, the air flow velocity FV is lowered in the vicinity of each of the side plates 14 due to an influence of the side plate 14.

Specifically, a sufficiently high wind velocity FV1 is obtained in the portion having no side plate 14. However, the wind velocity FV2 is lowered in the vicinity of each side plate 14, and the wind velocity FV3 is lowered more largely than the wind velocity FV2 in the vicinity of both ends of the impeller 7 which is adjacent to both side walls 1*a* and 1*b* of the main body casing 1.

Accordingly, in the case where the notches 17 having the same size are only provided in the outer end portion of the blade, the excessive reduction of the fan pressure is caused in the same manner as the case where the larger recesses than the notches 17 for obtaining the noise reducing effect are arranged in the vicinity of both ends of the impeller blade 15.

In order to solve the problem, in accordance with the present embodiment, the notches 17*a* (refer to FIG. 21) in both ends of the impeller blade 15 (in the portion close to each side plate 14) are formed smaller than the notches 17 (refer to FIG. 20) in the center portion of the impeller blade 15. Therefore, the noise reducing effect obtained by the notches 17 and 17*a* is sufficiently maintained. Further, in comparison with the structure in which the notches 17 having the same size are only provided discontinuously all over the entire impeller blade 15, it is possible to further increase the fan pressure and it is possible to avoid the reduction of the blowing performance.

Sixth Embodiment

Figure 22:
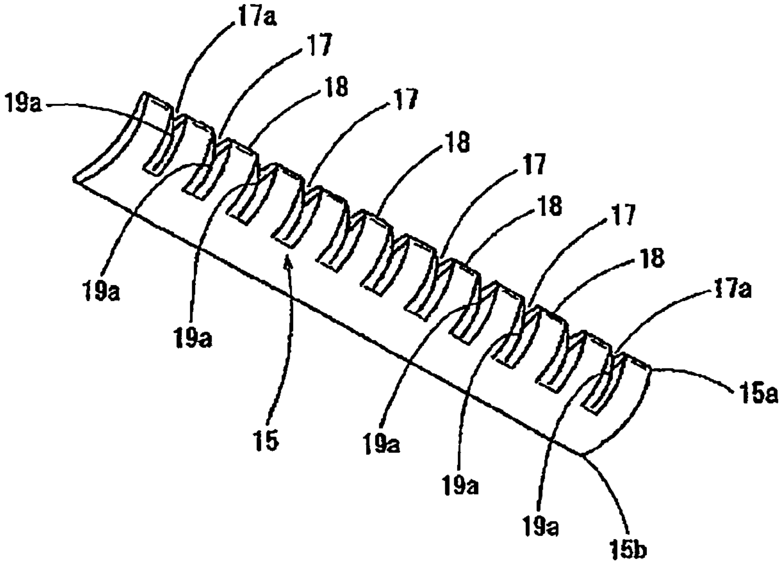
FIG. 22 is a perspective view of an impeller blade of a multi-blade fan in accordance with a sixth embodiment as seen from a negative pressure surface.

A description will be given of a multi-blade fan in accordance with a sixth embodiment with reference to FIG. 22.

In the present embodiment, in the multi-blade fan 3 in accordance with the third embodiment, the width and the depth of the notches 17*a* in the vicinity of both ends of the impeller blade 15 (in the portion close to each side plate 14) are set smaller than the notches 17 provided in the center portion of the impeller blade 15.

As mentioned above, a multi-blade fan such as a cross flow fan has a plurality of side plates 14 for fixing a plurality of impeller blades 15 arranged in the circumferential direction and securing the strength of the impeller 7. The side plates 14 are provided in both ends and the center portion in the longitudinal direction of the impeller 7. Accordingly, as shown in FIG. 34, the air flow velocity FV is lowered in the vicinity of each of the side plates 14 due to an influence of the side plate 14.

Specifically, a sufficiently high wind velocity FV1 can be obtained in the portion having no side plate 14. However, the wind velocity FV2 is lowered in the vicinity of each side plate 14, and the wind velocity FV3 is lowered more largely than the wind velocity FV2 in the vicinity of both ends of the impeller 7 which is adjacent to both side walls 1*a* and 1*b* of the main body casing 1.

Accordingly, in the case where the notches 17 having the same size are only provided in the outer end portion of the blade, the excessive reduction of the fan pressure is caused in the same manner as the case where the larger recesses than the notches 17 for obtaining the noise reducing effect are arranged in the vicinity of both ends of the impeller blade 15.

In order to solve the problem, in accordance with the present embodiment, the notches 17*a* in both ends of the impeller blade 15 (in the portion close to each side plate 14) are formed smaller than the notches 17 provided in the center portion of the impeller blade 15. Therefore, the noise reducing effect obtained by the notches 17 and 17*a* is sufficiently maintained. Further, in comparison with the structure in which the notches 17 having the same size are only provided discontinuously all over the entire impeller blade 15, it is possible to further increase the fan pressure and it is possible to avoid the reduction of the blowing performance.

Seventh Embodiment

Figure 23:
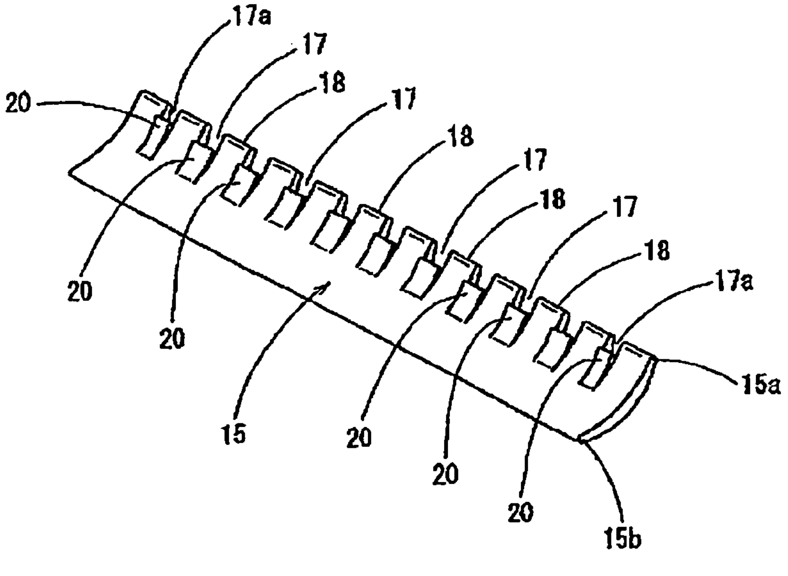
FIG. 23 is a perspective view of an impeller blade of a multi-blade fan in accordance with a seventh embodiment as seen from a pressure surface.
Figure 24:
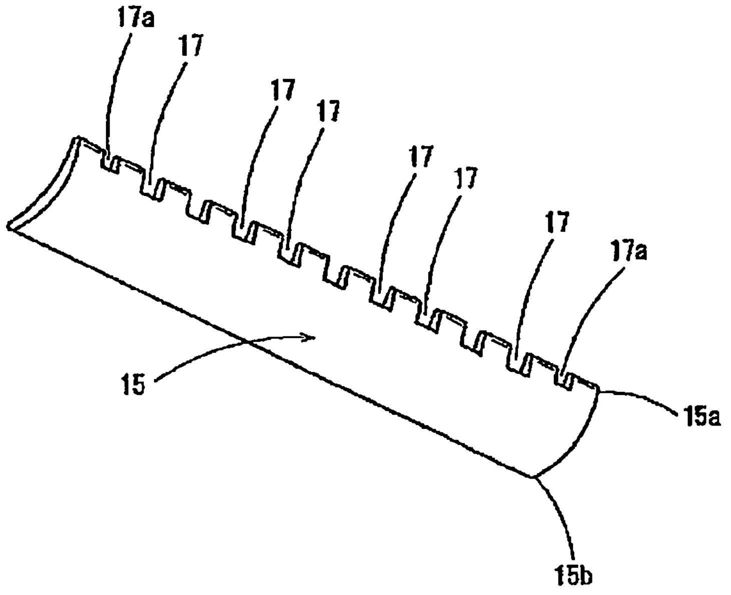
FIG. 24 is a perspective view of the impeller blade as seen from the negative pressure surface.

A description will be given of a multi-blade fan in accordance with a seventh embodiment with reference to FIGS. 23 and 24.

In the present embodiment, in the multi-blade fan 3 in accordance with the second embodiment, the width and the depth of the notches 17*a* in the vicinity of both ends of the impeller blade 15 (in the portion close to each side plate 14) are set smaller than the width and the depth of the notches 17 provided in the center portion of the impeller blade 15.

A multi-blade fan such as a cross flow fan has a plurality of side plates 14 for fixing a plurality of impeller blades 15 arranged in the circumferential direction and securing the strength of the impeller 7. The side plates 14 are provided in both ends and the center portion in the longitudinal direction of the impeller 7. Accordingly, as shown in FIG. 34, the air flow velocity FV is lowered in the vicinity of each of the side plates 14 due to an influence of the side plate 14.

Specifically, a sufficiently high wind velocity FV1 is obtained in the portion having no side plate 14. The wind velocity FV2 is lowered in the vicinity of each side plate 14, and the wind velocity FV3 is lowered more largely than the wind velocity FV2 in both end portions of the impeller 7 which is adjacent to both side walls 1*a* and 1*b* of the main body casing 1.

Accordingly, in the case where the notches 17 having the same size are only provided in the outer end portion of the blade, the excessive reduction of the fan pressure is caused in the same manner as the case where the larger recesses than the notches 17 for obtaining the noise reducing effect are arranged in the vicinity of both ends of the impeller blade 15.

In order to solve the problem, in accordance with the present embodiment, the notches 17*a* in both ends of the impeller blade 15 (in the portion close to each side plate 14) are formed smaller than the notches 17 provided in the center portion of the impeller blade 15. Therefore, the noise reducing effect obtained by the notches 17 and 17*a* is sufficiently maintained. Further, in comparison with the structure in which the notches 17 having the same size are only provided discontinuously all over the entire impeller blade 15, it is possible to further increase the fan pressure and it is possible to avoid the reduction of the blowing performance.

Eighth Embodiment

Figure 25:
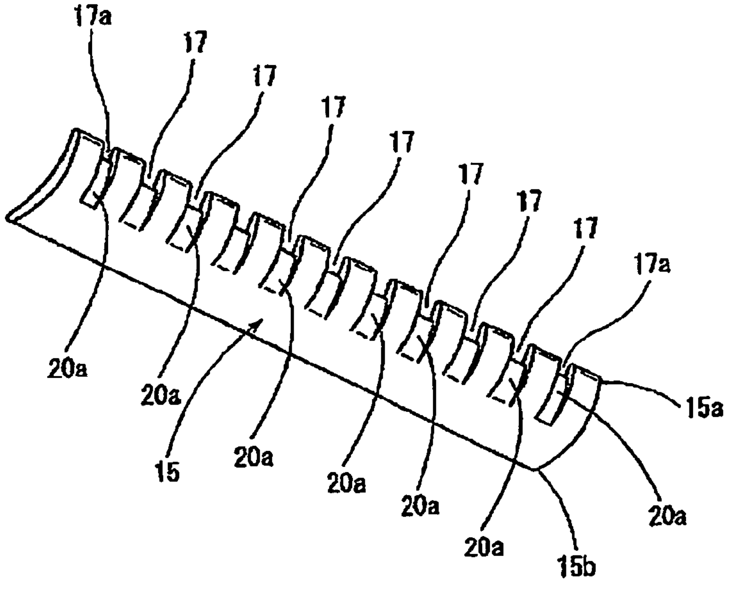
FIG. 25 is a perspective view of an impeller blade of a multi-blade fan in accordance with an eighth embodiment as seen from a negative pressure surface.

A description will be given of a multi-blade fan in accordance with an eighth embodiment with reference to FIG. 25.

In the present embodiment, in the multi-blade fan 3 in accordance with the fourth embodiment, the width and the depth of the notches 17*a* in the vicinity of both ends of the impeller blade 15 (in the portion close to the each plate 14) are set smaller than the width and the depth of the notches 17 provided in the center portion of the impeller blade 15.

As mentioned above, a multi-blade fan such as a cross flow fan or the like has a plurality of side plates 14 for fixing a plurality of impeller blades 15 arranged in the circumferential direction and securing the strength of the impeller 7. The side plates 14 are provided in both ends and the center portion in the longitudinal direction of the impeller 7. Accordingly, as shown in FIG. 34, the air flow velocity FV is lowered in the vicinity of each of the side plates 14 due to an influence of the side plate 14.

Specifically, a sufficiently high wind velocity FV1 can be obtained in the portion having no side plate 14, however, the wind velocity FV2 is lowered in the vicinity of each side plate 14, and the wind velocity FV3 is lowered more largely than the wind velocity FV2 in both end portions of the impeller 7 which is adjacent to both side walls 1*a* and 1*b* of the main body casing 1.

Accordingly, in the case where the notches 17 having the same size are only provided in the outer end portion of the blade, the excessive reduction of the fan pressure is caused in the same manner as the case where the larger recesses than the notches 17 for obtaining the noise reducing effect are arranged in the vicinity of both ends of the impeller blade 15.

In order to solve the problem, in accordance with the present embodiment, the notches 17*a* in both ends of the impeller blade 15 (in the portion close to each side plate 14) are formed smaller than the notches 17 provided in the center portion of the impeller blade 15. Therefore, the noise reducing effect obtained by the notches 17 and 17*a* is sufficiently maintained. Further, in comparison with the structure in which the notches 17 having the same size are only provided discontinuously all over the entire impeller blade 15, it is possible to further increase the fan pressure and it is possible to avoid the reduction of the blowing performance.

Other Embodiments

In the fifth to eighth embodiments, for example, in the case where the side plates 14 are positioned in the vicinity of both ends of the impeller 7, that is, in the case where side plates 14 are adjacent to the side walls 1*a* and 1*b* of the main body casing 1, the size reduction degree of the notches 17*a* formed relatively small may be changed, or the number of the notches 17*a* may be increased as appropriate. Accordingly, it is possible to increase the air flow velocity, and the blowing performance is improved as much as possible.

In accordance with this structure, it is possible to recover the air flow velocity reduction by the side plates 14 in both ends of each of the impeller blades 15, and it is possible to recover the air flow velocity reduction by the side walls 1*a* and 1*b* of the main body casing 1 which is adjacent to both ends of the impeller 7.

In the case where the impeller 7 has no side plate 14 in the portions except both ends thereof, it is preferable to set one or a plurality of notches 17*a* in both ends of the impeller 7, thereby forming the notches 17*a* relatively small.

Accordingly, the noise reducing effect by the notches 17 and 17*a* is maintained. Further, in comparison with the structure in which the notches 17 having the same size are only provided discontinuously, it is possible to further increase the fan pressure.

The invention claimed is:

1. A multi-blade fan comprising a plurality of notches in a blade edge on an outer side of an impeller blade, characterized in that, in a pressure surface of the impeller blade receiving an air pressure on the basis of rotation of the multi-blade, a projection protruding along a thickness direction of the impeller blade is provided in a rear portion of each of the notches.

2. The multi-blade fan according to claim 1, characterized in that the impeller has a recess in a negative pressure surface on an opposite side to the pressure surface, wherein the recess is formed by removing a portion corresponding to the projection in the negative pressure surface.

3. The multi-blade fan according to claim 2, characterized in that the projection and the recess extend along a single circular arc.

4. The multi-blade fan according to claim 2, characterized in that the projection and the recess extend along a plurality of circular arcs having different curvatures.

5. The multi-blade fan according to any one of claims 1 to 4, characterized in that the height of the projection becomes smaller toward the blade edge of the impeller blade.

6. The multi-blade fan according to claim 2, characterized in that the depth of the recess becomes smaller toward the blade edge of the impeller blade.

7. The multi-blade fan according to claim 1, characterized in that notches in both ends of the impeller blade are smaller than notches provided in a center portion of the impeller blade.

8. The multi-blade fan according to claim 1, characterized in that notches in both ends of the multi-blade fan are smaller than notches provided in a center portion of the multi-blade fan.

9. The multi-blade fan according to claim 1, characterized in that the multi-blade fan is used as a blower for an air conditioner.

* * * * *